United States Patent
Asma et al.

(10) Patent No.: US 7,309,507 B2
(45) Date of Patent: Dec. 18, 2007

(54) DEVICE AND METHOD FOR MANUFACTURING AND PACKAGING LOLLIPOPS

(75) Inventors: Seferinus Jelle Asma, Veldhoven (NL); Henricus Antonius Maria Der Kinderen, Tegelen (NL)

(73) Assignee: CFS Weert B.V., Weert (NL)

( * ) Notice: Subject to any disclaimer, the term of this patent is extended or adjusted under 35 U.S.C. 154(b) by 363 days.

(21) Appl. No.: 10/496,353

(22) PCT Filed: Nov. 21, 2002

(86) PCT No.: PCT/NL02/00754

§ 371 (c)(1), (2), (4) Date: Oct. 20, 2004

(87) PCT Pub. No.: WO03/043436

PCT Pub. Date: May 30, 2003

(65) Prior Publication Data

US 2005/0079246 A1  Apr. 14, 2005

(30) Foreign Application Priority Data

Nov. 21, 2001 (NL) .................................. 1019408

(51) Int. Cl.
*A23G 7/00* (2006.01)

(52) U.S. Cl. .................... 426/421; 425/126.2; 425/128; 425/225; 425/237; 425/453; 426/515

(58) Field of Classification Search ............. 425/126.2, 425/128, 237, 225, 453; 426/515, 421
See application file for complete search history.

(56) References Cited

U.S. PATENT DOCUMENTS

| | | | | |
|---|---|---|---|---|
| 2,005,854 A | * | 6/1935 | Davis et al. ................. | 425/513 |
| 2,278,574 A | * | 4/1942 | Spohr et al. ................ | 426/421 |
| 3,541,973 A | * | 11/1970 | Aquarius ..................... | 425/512 |
| 4,847,090 A | | 7/1989 | Della Posta et al. | |
| 5,022,841 A | | 6/1991 | Rizzi | |

FOREIGN PATENT DOCUMENTS

| | | |
|---|---|---|
| BE | 877 880 | 11/1979 |
| DE | 29 20 814 | 12/1979 |
| EP | 0 352 233 | 1/1990 |
| EP | 1 000 551 | 5/2000 |
| WO | WO 01 58273 | 8/2001 |

* cited by examiner

*Primary Examiner*—Robert B. Davis
(74) *Attorney, Agent, or Firm*—Young & Thompson

(57) ABSTRACT

Device for manufacturing lollipops, comprising a stationary supply (4, 5a, 5b) for a strand (5) of lollipop material in flat cross-section condition, a series of flat lollipop moulds (3a, 3b) movable past the supply according to a path of movement. The lollipop moulds having a main axis and each consisting of a lower mould (3a) and an upper mould (3b), which can be closed onto the lower mould while cutting off a leading portion of the strand, the supply being positioned for discharge of the strand in a direction transverse to the main axis.

28 Claims, 8 Drawing Sheets

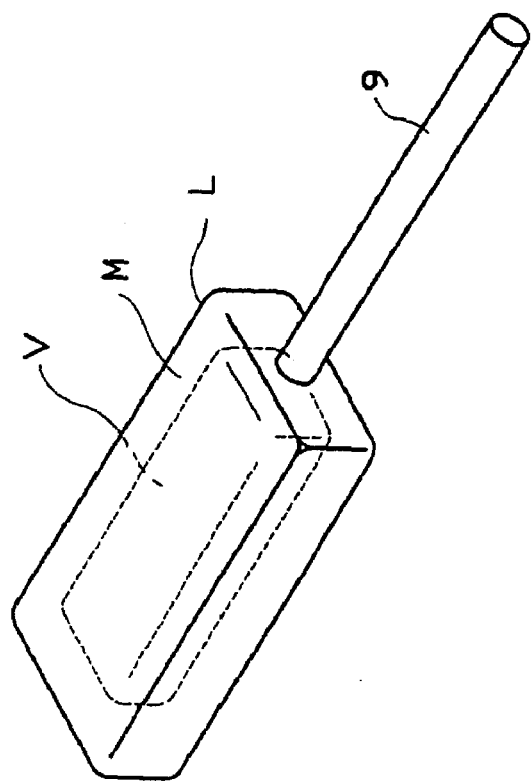
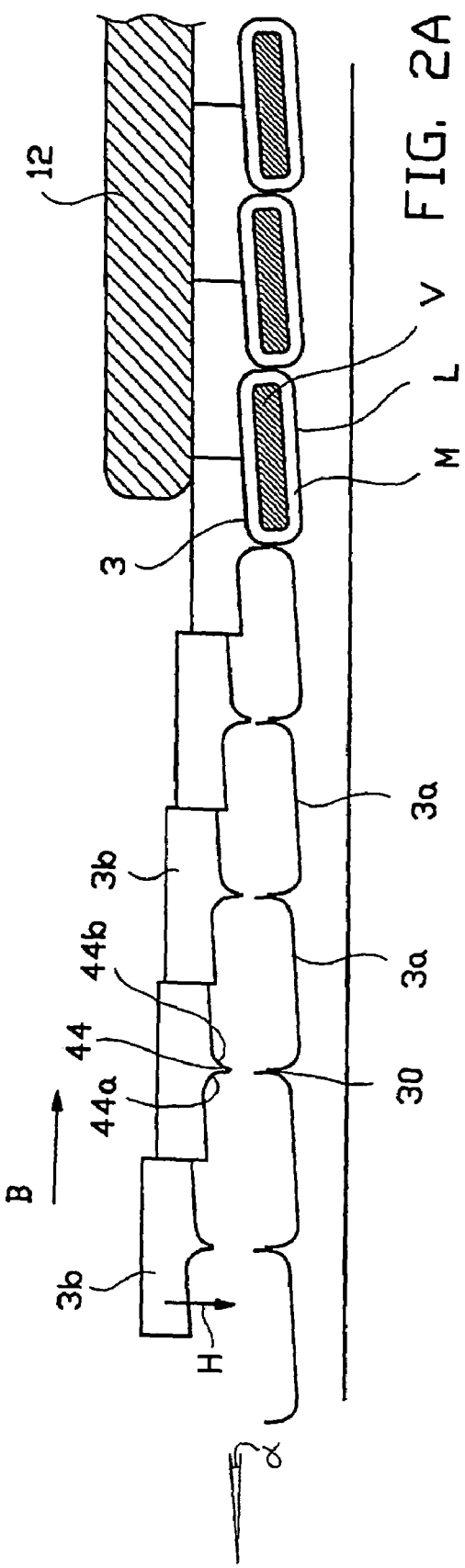

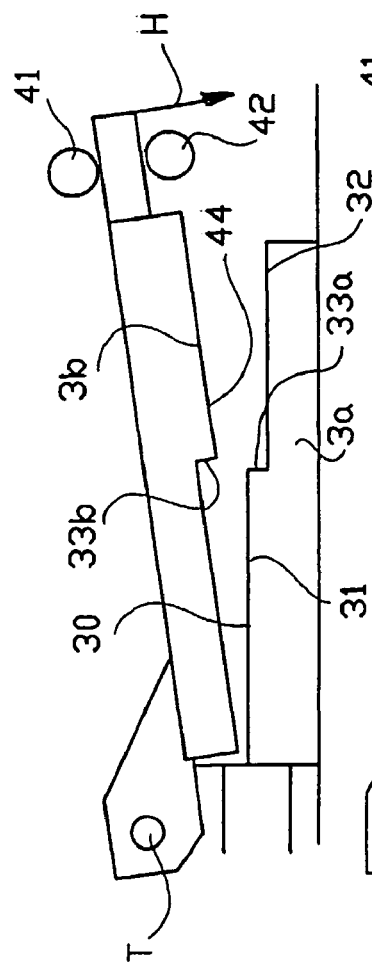
FIG. 2B
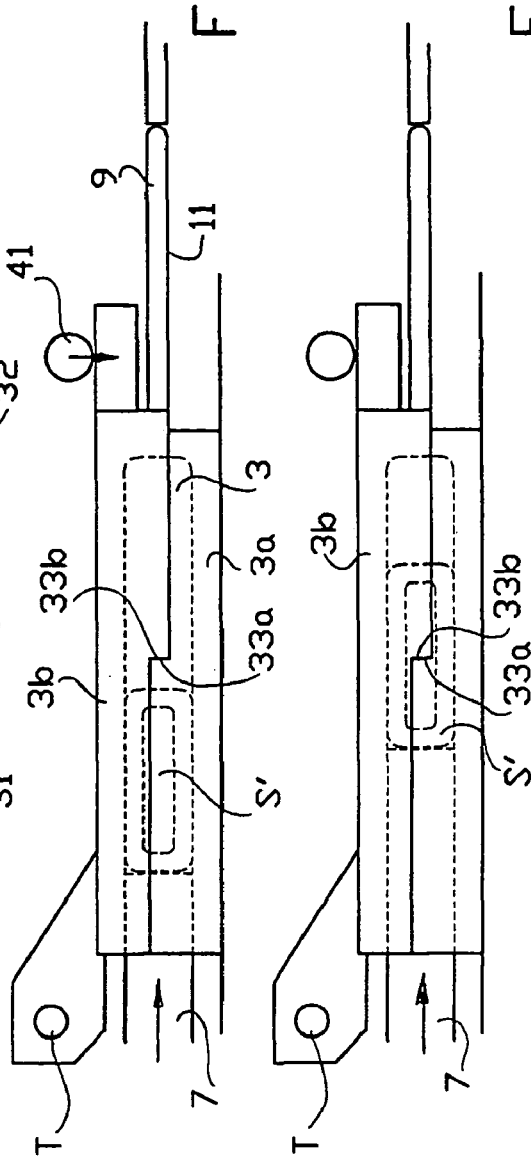
FIG. 2C
FIG. 2D
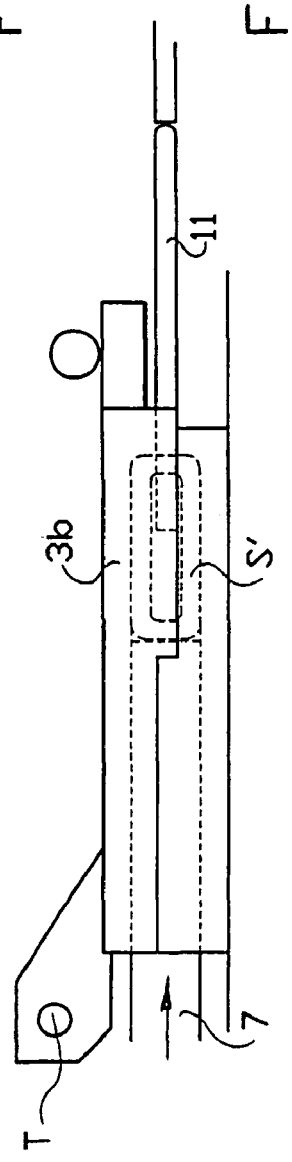
FIG. 2E

DEVICE AND METHOD FOR MANUFACTURING AND PACKAGING LOLLIPOPS

BACKGROUND OF THE INVENTION

The invention relates to a device and a method for manufacturing lollipops.

It is known to supply a strand of confectionery to a lollipop machine, which is provided with a drum having a series of lower moulds on it and a series of upper moulds that can successively be closed onto them, which together define a mould space for manufacturing so-called round lollipops. The upper moulds are offset half a mould pitch with respect to the lower moulds, such that each upper mould defines half the upper side of the one mould and half the upper side of the next mould, and in between is provided with a downwardly extending rib, cooperating with the opposite rib between the lower moulds. After closing the upper mould, which takes place by tilting the upper mould in a plane containing the centre line of the drum, on the one hand a stamp is pressed into the mould cavity from one axial end, and after that from the other axial end a stick into the lollipop mass. After approximately half a revolution of the drum the upper moulds are opened again and the lollipops are taken over by a transferrer for transfer to a packaging conveyor, in which they are packaged in a sandwich packaging.

The strand is supplied in a more or less tangential direction to the drum. For manufacturing round lollipops having a filling, a strand is supplied which is provided with a filling in the centre.

It is furthermore known to manufacture and package flat lollipops, that means lollipops having an unround or flattened or perfectly flat cross-section, in a sandwich packaging. A strand of confectionery is then supplied in flat shape to a drum provided with a circumferential series of moulds. The moulds are accessible to the strand from one axial side, which strand is subsequently cut through by means of a separate cutter, after which the moulds are closed. At the radial inside the mould is pressurised, after which a stick is inserted from the other axial side.

It is an object of the invention to provide a device and method for manufacturing flat lollipops having a filling.

A further object of the invention is to provide a device and method for manufacturing flat lollipops at high speed.

Yet a further object of the invention is to provide a device and method for manufacturing flat lollipops having rounded off edges.

SUMMARY OF THE INVENTION

For achieving at least one of said objects the invention provides from one aspect a device for manufacturing lollipops, comprising a stationary supply for a strand of lollipop material a flat cross-section condition, a series of flat lollipop moulds movable past the supply according to a path of movement, the lollipop moulds having a main axis and each consisting of a lower mould and an upper mould, which can be closed onto the lower mould while cutting off a leading portion of the strand, the supply being positioned for discharge of the strand in a direction transverse to the main axis.

It has appeared that with the device according to the invention flat lollipops can be made at high speed, possibly lollipops with a filling.

After manufacturing the flat lollipops they have to be removed out of the moulds. The upper moulds are then first turned away from the lower moulds, and after that the lollipops can be dropped out of the lower moulds or actively be removed. However, the lollipops have a sticky outside, as a result of which there is a chance that the lollipops keep sticking in the lower moulds. In order to prevent that a filled lower mould arrives again at the strand supply, in the manufacturing of round lollipops use is therefore made of a scraper placed behind the intended location of discharge of the lollipops from the moulds, which scraper has to exert an expelling force on the lollipops. This is not always successful, as a result of which a lollipop remains where it is or the scraper scrapes off a piece of the lollipop. In case of flat lollipops this problem is much bigger as the sticky surface is relatively large. The risk of sticking in the mould increases then. A lower mould having a smaller surface than the upper mould is therefore strived for, so that the part protruding from the lower mould is bigger, but as a result this may affect the filling process.

To that end the invention, from a further aspect, provides a device of the aforementioned type, in which the moulds, considered in cross-sectional plane transverse tot he main axis, are inclined with respect to the path of movement. As a result the scraper or the like may initiate an extra vertical force, due to which discharge of the flat lollipops is enhanced.

Preferably the moulds with their in process direction leading edges are at a higher level than their in process direction trailing edges, as a result of which a loosening tool, such as a scraper or the like is able to exert a tilting moment on the flat lollipops in the moulds. The tilting angle may be of the order of magnitude of 4-10 degrees.

In one embodiment use is made of a stationary scraper extending from the upstream side to just above the boundaries of the lower moulds.

Preferably the upper moulds are each defined by connecting portions of two adjacent upper mould members, which are closable in succession onto the lower mould while cutting off a leading portion of the strand, the upper mould members being arranged in a staggered manner over half a mould width with respect to the lower moulds.

It is known to let the upper moulds each be defined by the connecting portions of two adjacent upper mould members, which are closable in succession onto the lower mould while cutting off a leading portion of the strand, the upper mould members being arranged staggered over half a mould width with respect to the lower moulds, the upper mould members being provided with a first separation rib oriented towards the lower mould, and the lower moulds being separated from each other by means of a second separation rib, which is positioned for closing contact with the first separation rib, the upper mould members being tiltable about an axis transverse to the main axis of the lollipop mould from an open position to a closing position and the separation ribs being capable of exerting a cutting action with each other on the strand.

However, it may occur that after closing the moulds the lollipops remain connected to each other by means of a thin fleece. This fleece may remain intact during pressing in the lollipops in the moulds, so that adjacent lollipops at the location of the discharge to further parts of the device can still be stuck together. As a result the further process is disrupted. This is improved upon by a further measure according to the invention, according to which the first and second separation ribs in the direction of the main axis have been provided with corresponding discontinuities; such as steps.

Here also a cutting edge is realised running in a deviating direction (namely deviating from the usually straight separation ribs). Usually the lollipop mass is pressed in the closed mould in the direction of the main axis. During pressing the lollipop mass in the closed moulds the fleece, which moves along, partially or as a whole encounters the discontinuity, and thereby is torn or cut off, so that adjacent lollipop masses are separated from each other. The cutting action is further enhanced when the discontinuity forms a step oriented perpendicular to the main axis.

The flat strand is pressed flat during the cutting off at the leading and the trailing side and cut through in a reliable manner. Because of the discontinuities, such as steps, the separation can be sharp and reliable to a large extent.

The design of the cutting edges of the lower mould and the upper mould in the device according to the invention renders the device very suitable to use in the manufacturing of flat lollipops provided with a filling from a flat strand supplied transverse to the main axis. This is further enhanced when the separation ribs are formed smoothly concave, or the upper and lower moulds are sidewardly limited by rounded off edges extending in the direction of the main axis.

The cutting action is further enhanced when the discontinuity forms a step oriented perpendicular to the main axis.

The cutting action is further enhanced when the discontinuity forms a step forming a cutting edge which is substantially tangential to the tilting path of the upper moulds.

Preferably the discontinuity is situated approximately halfway the main axis of the mould, as a result of which the strand undergoes a double cutting action in the centre.

The cutting action is further enhanced when the second separation rib forms a step oriented away from the tilting axis and the device is provided in the usual manner with means active in a direction away from the tilting axis for pressing the lollipop mass in the mould in the direction of the main axis. The first separation edge will form a cutting edge facing the tilting axis, along which the lollipop mass is pressed.

It is further preferred when the discontinuity forms a tip by which the fleece is immediately effectively engaged in cutting through.

The second separation rib preferably comprises a low portion and a high portion separated by the discontinuity.

In case of the aforementioned scraper it may in an advantageous manner extend into the path of the lower positioned portion of the second separation rib, so that it extends as low as possible, in that case possibly even below the centre section of the lollipop.

It is noted that the separation ribs having discontinuities as mentioned above are particularly advantageous in the forming of flat lollipops, but that they can already be advantageous in the forming of lollipops having other shapes, such as round lollipops.

Preferably the upper and lower moulds are sidewardly bounded by rounded off edges extending in the direction of the main axis and changing into the first and the second separation ribs, respectively.

When using the separation ribs provided with discontinuities it is advantageous when the scraper extends in the path of the lower positioned portion of the separation rib of the lower mould.

Preferably the device with the flat moulds is furthermore provided with means for pressing the mass of the leading portion of the strand accommodated in the mould in the direction of the main axis and/or with means for urging a lollipop stick into the mass in an opposite direction. It is furthermore preferred when the moulds are arranged on a drum, the lower moulds being a part of the surface of the drum.

A general problem in lollipop manufacturing machines is that the stock of lollipop sticks can run out, and that when this is established—often not until at the exit of the accompanying packaging machine: lollipops without a stick are then packaged—a considerable number of moulds have been filled with lollipop material. The lollipops made—without a stick—can be thrown away, which is a big waste of material.

It is a further object of the invention to provide a general solution for this problem. From a further aspect of the invention a device is provided to that end for manufacturing lollipops from a strand of lollipop material, furthermore provided with a stock of lollipop sticks and a stock sensor for detecting the sticks in stock at a certain recognizable level related to a number of sticks in stock, the supply comprising supply rollers active on traction for the strand, as well as a strand cutter positioned upstream of it, the stock sensor and the strand cutter being coupled through a control unit activating the strand cutter with a delay corresponding to the processing time of the number of sticks after the stock sensor no longer detects sticks at the aforementioned level. In this way it is possible to let the machine make a certain number of supply and moulding actions related to the stock when it has been established in an automatic manner that a certain stock of sticks is left. The strand cutter is then activated, so that no more lollipop material is supplied to the moulds. The portion of the strand situated upstream of the strand cutter and the supply rollers then immediately comes to a standstill, and after filling the stock of sticks can simply manually be brought into engagement with the supply rollers.

On the other hand it may occur that sticks are dispensed without lollipop material being present in the moulds. In order to prevent this from happening a device for manufacturing lollipops is provided with a stock of lollipop sticks and a closing means for the stock, and with a strand sensor at the location of the supply for detecting a strand, the closing means and the strand sensor being coupled through a control unit activating the closing means with a delay corresponding to the passage time of the portion or length of strand between the closing means and the strand sensor. The dispensing of sticks can thus be actively controlled, adjusted to the feed of the strand.

After the lollipops have been removed from the moulds they have to be transferred to the actual packaging machine.

It is a further object of the invention to provide a smoothly working means to that end, with which the lollipops of any shape can be transferred from a moulding drum to a packaging conveyor. According to a further aspect of the invention the drum is provided with transverse slits for accommodation of the lollipop sticks, stationary stick lifters being placed in a track of the drum where the moulds are closed and the sticks have been pressed into the lollipop mass, which stick lifters are positioned for transferring the sticks by means of gravitational force to a lollipop transfer drum placed near it and provided with recesses for the sticks for transferring the lollipops to a packaging conveyor, the stick lifters merging into confinements extending along the circumference of the transfer drum for keeping the sticks in the recesses.

Preferably the packaging conveyor is provided with stick clamps, and an outwardly spring-biassed transfer means is placed between the transfer drum and the conveyor, which transfer means urges the sticks out of the recesses on the transfer drum into the clamp of the conveyor. As a result the sticks are transferred in a reliable manner.

It is known to package lollipops in a sandwich foil packaging device by means of a packaging conveyor having a supply for an upper foil and a lower foil, above and underneath, respectively, the lollipops supplied, and means for making a longitudinal seal on either side of the lollipops, means for making a transverse seal on either side of the lollipops, with means for separating the foils at the location of the transverse seals. It is furthermore known to make the longitudinal seal and the transverse seal with one single pair of rollers and then to cut the foils by means of a pair of blade rollers. This requires a near-perfect fit of the lollipops in the seal rollers, which is not often realised. Alternatively a pair of rollers is used for the longitudinal seal, a pair of rollers for the transverse seal and then a pair of blade rollers. However, this requires more space.

A further object of the invention is to improve on this to which end—from yet another aspect—the means are provided for making the transverse seals and the separation means are provided on the same pair of first rollers, cooperating with each other and placed on either side of the path of movement of the lollipops and foils, and in which the means for making longitudinal seals are provided on a second pair of rollers, placed upstream of the first pair of rollers.

In common packaging machines for sandwich packagings the seal and cutting rollers are difficult to reach in case of repairing failures and maintenance, because the conveyor for the sticks runs along the front. It is a further object of the invention to improve on this, to which end according to yet a further aspect a packaging conveyor is provided having a supply for an upper foil and a lower foil, above and underneath, respectively, the lollipops supplied, and means for making a longitudinal seal on either side of the lollipops, means for making a transverse seal on either side of the lollipops, with means for separating the foils at the location of the transverse seals, the packaging conveyor being provided with a circulating body having holders for the lollipop sticks, as well as a drive for it, the circulating body being arranged on a frame which is movable between a position adjacent to the sealing means for cooperation therewith, and a removed position in which the sealing means are freely accessible.

Preferably the frame is pivotable about an axis coinciding with the drive of the circulating body, so that for the drive in view of tilting no complex provisions have to be made.

From a further aspect the invention provides a method for making flat lollipops having a filling, a strand of lollipop material being supplied to a circulating series of moulds, comprising a circulating series of fixed lower moulds and circulating along with them a series of upper moulds that can be opened and closed, while cutting off the leading portion of the strand necessary for the lollipop in question, the strand being supplied flat, preferably in a direction situated in a plane parallel to the plane of circulation.

Preferably the flat strand of lollipop material comprises an enveloped filling.

Preferably the lower moulds move according to a path of moulding and the strand is introduced according to an introduction path which is at an acute angle to the path of moulding, considered in a plane parallel to the path of moulding, preferably according to a circular path.

Preferably each upper mould is provided by two consecutive upper mould members, which one after the other are brought into closing engagement with the lower mould in question, the cutting off of the strand taking place by means of cooperating cutting edges at both the consecutive upper mould members and the lower mould, the cooperating cutting edges being provided with discontinuities formed in the plane of the cutting motion.

Preferably the lower moulds during reception of the leading portion of the strand are kept tilted, preferably tilted backwards, with respect to the path of moulding.

From a further aspect the invention provides a lollipop having a flat confectionery part and a stick, the confectionery part being provided with a filling enveloped all round.

Preferably the filling has a similar shape as the confectionery part.

BRIEF DESCRIPTION OF THE DRAWINGS

The invention will be elucidated on the basis of an exemplary embodiment shown in the attached drawings, in which:

FIG. 2A shows an end view of a fold-out of a series of consecutive moulds;

FIG. 2B shows an assembly of an upper mould and lower mould while being closed;

FIG. 2C-E show some stages of the moulding process on a device according to the invention;

FIG. 3 shows a flat lollipop according to the invention;

DETAILED DESCRIPTION OF THE INVENTION

Figure 1:
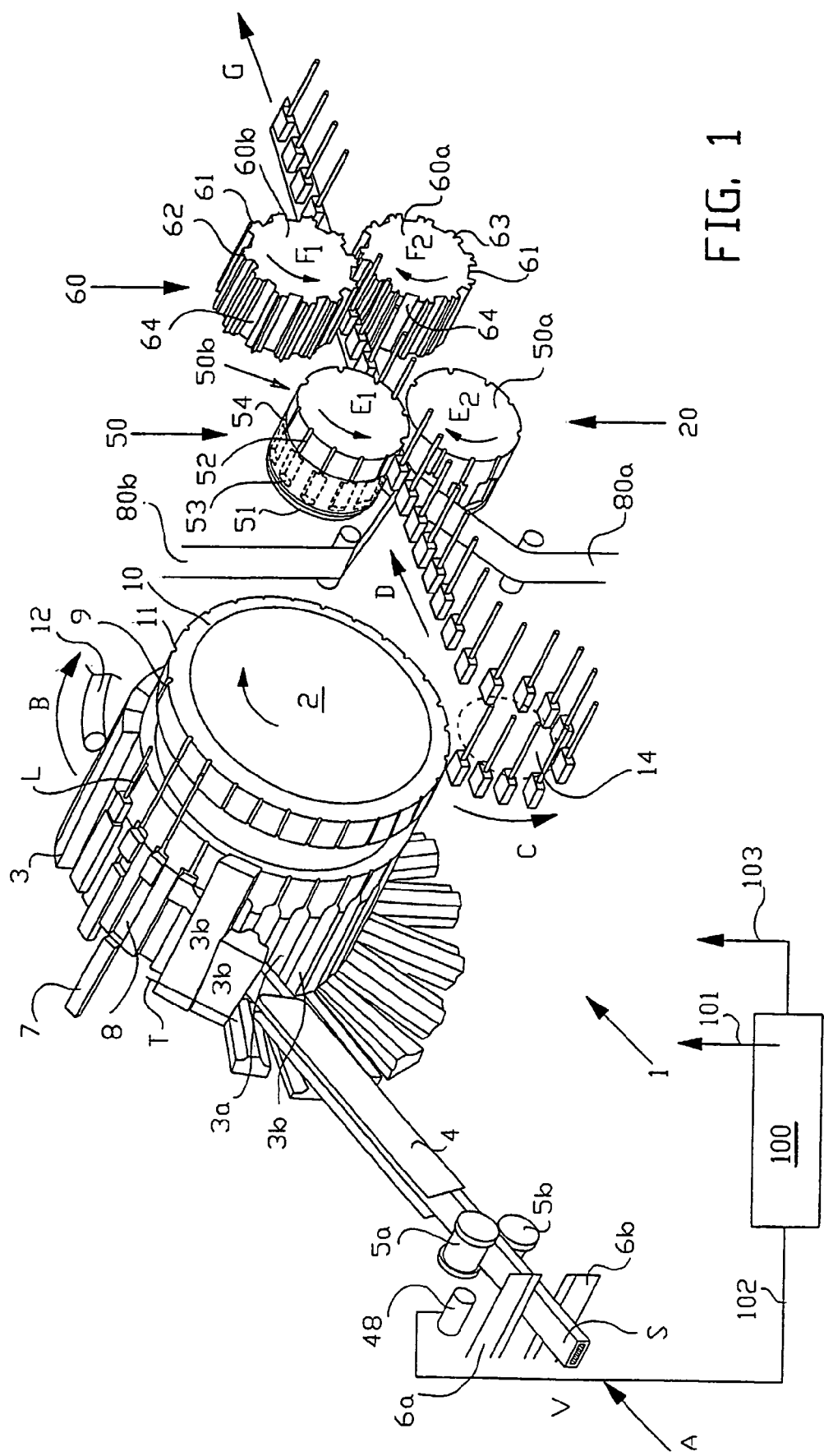
FIG. 1 shows a schematic view of an exemplary embodiment of a device according to the invention.

The device 1 shown in FIG. 1 is a combined machine for manufacturing and packaging flat lollipops, in which the flat lollipops cannot only be moulded but can also be packaged. The device 1 comprises a drum 2, which circulates in the direction B, and is provided with a circumferential series of moulds 3 for manufacturing flat—filled—lollipops L (FIG. 3), which moulds 3 are formed by a circulating continuous series of lower moulds 3a, and a series of upper moulds 3b, each arranged staggered half a pitch with respect to the lower moulds 3a and hinging about an own tangential axis T. The folding down of the upper moulds 3b towards the lower moulds 3a and lifting them up again takes place in a controlled manner by means of permanent guides, such as guides 41, 42 (FIG. 1A), positioned along the circumference of the drum 2.

On the outside of the drum wall 10, as considered in axial direction on either side of the lower moulds 3a, aligned therewith, axially oriented channels have been arranged, and namely wide channels 8 at the side of the lower mould 3a near the hinge of the upper mould members 3b, and in which mould press pin 7 is axially slidable, which mould press pin 7 is shaped similar to the mould cavity 3 formed by the members 3a, 3b, as well as narrow grooves 11, in which sticks 9 coming from a stick holder 40 yet to be discussed are axially slidable, in order to when the moulds are closed be pressed into the mould mass L. It will be understood that although they are not shown, means are present for moving the press pins 7 and the sticks 9 that are known per se in machines for manufacturing round lollipops.

Figure 1A:
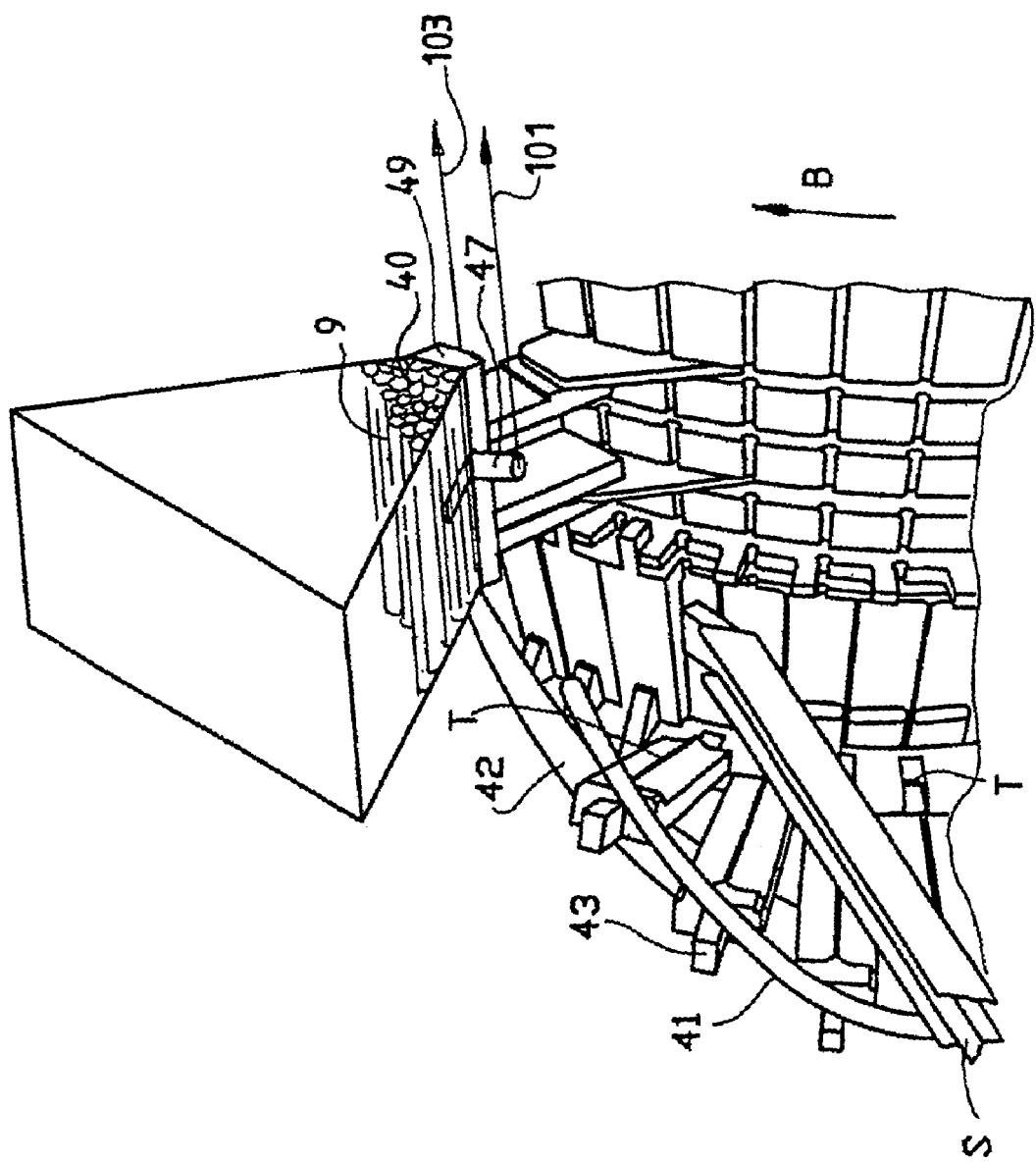
FIG. 1A shows a detail of the drum of FIG. 1, with additional stock of sticks.
Figure 1C:
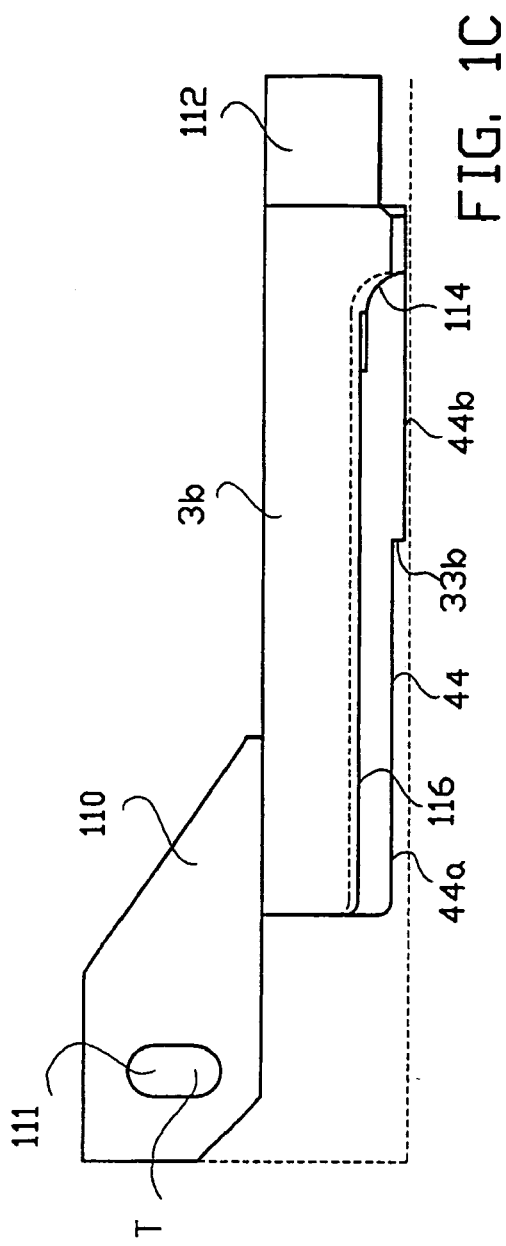
FIG. 1B-D show an upper mould in cross-section and in bottom view.
Figure 1D:
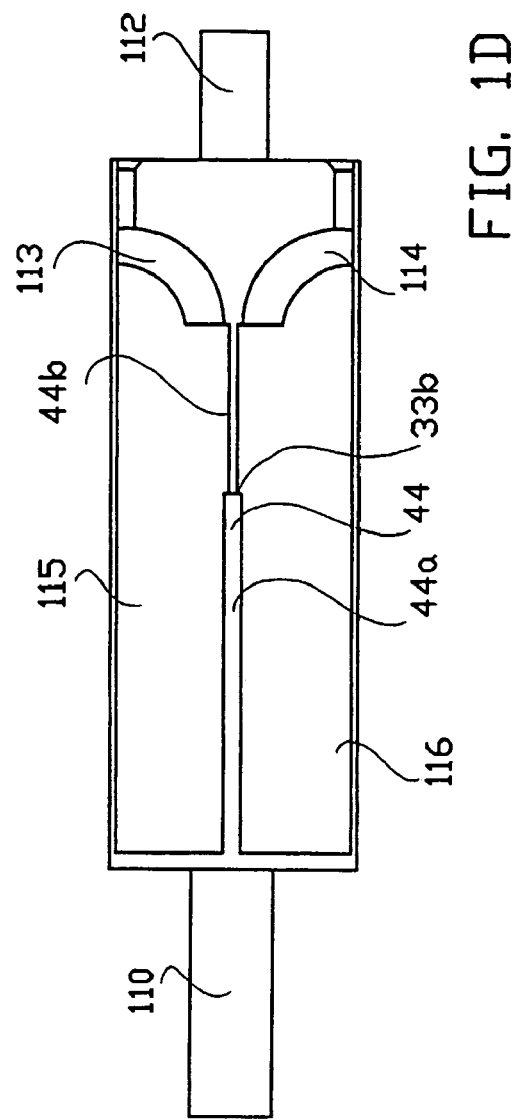
Figure 1B:
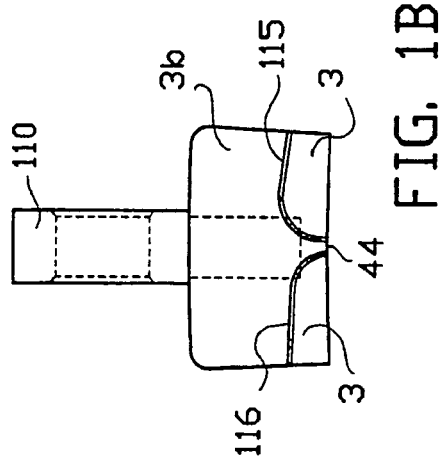

The upper moulds 3b are more clearly shown in FIGS. 1B-D, formed for use on a drum provided with lower moulds. The upper moulds 3b are at one end provided with an upright plate 110, in which a hinge hole 111 has been made. The rib 44 which separates both mould members has a high part and a low part, separated from each other by step 33b. At the other end the mould members are ended by a smoothly curved plane 113 and 114. In cross-section of FIG. 1B it can be seen that the mould members connect to the rib 44 by curved planes. As a result of the curvature of the drum and the tilted orientation of the consecutive lower moulds as a result of said curvature, the straight upper planes for both mould members are tilted with respect to each other.

At the upstream side of the mould drum 2 there is a U-shaped supply gutter 4 which is permanently positioned on the machine 1 by means of means that are not further shown. Permanent to the machine as well are drive rollers 5a, 5b driven by drive means that are not further shown, for driving a flat strand S of confectionery for manufacturing lollipops in the direction A. Upstream from the drive rollers 5a, 5b there is a cutting mechanism 6a, 6b for cutting through the strand S with filling V.

At the downstream side of the mould drum 2 there is transfer disk 14, which (see FIG. 4) has been provided with accommodation spaces 15 in which sticks 9 are snugly accommodated. For keeping the sticks in the accommodation spaces 15 one or more guide plates 16 are provided, which with their edge 17 facing the disk 14 are situated at the short distance, suitable to that end, from the circumferential edge of the disk 14. The disk 14 is driven in the direction C. Between the drum 2 and the disc 14 there is a guide 70, which extends within the circumference of the drum edge 10 in the path of the sticks 9 in order to urge the sticks 9 out of the grooves 11 and into the accommodation spaces 15.

When the lollipops should not be packaged or packaged elsewhere, a collection tray can easily be placed on—and in—the location of the transfer disk 14 and its accompanying means.

In order to prevent that material of the lollipops L sticks to the lower moulds 3a at the level of the transfer disk 14 or, when said disk is absent, at the location of the—falling—discharge to a collection tray, at the lower track of the drum 2, a kind of chisel 93 is positioned in a fixed stationary manner, which chisel has a tip 94 which is oriented opposite the flow, which extends up to near the path of the ribs 30. Special is that (see FIG. 2A) the moulds formed by members 3a, 3b are at an angle α to the tangential to the drum, and such that the main planes incline upwards in direction of movement. As a result the thickness of the lollipop material just downstream of the rib 30 is smaller than is the case on the trailing areas. The tip 94 will therefore be quick and effective in realising sufficient lifting force on the lollipop material that keeps sticking in the lower mould 3a. In this way it is almost ruled out that still filled lower moulds 3a are guided past the location where the strand S is supplied, and a failure would otherwise arise due to double material.

Figure 4:
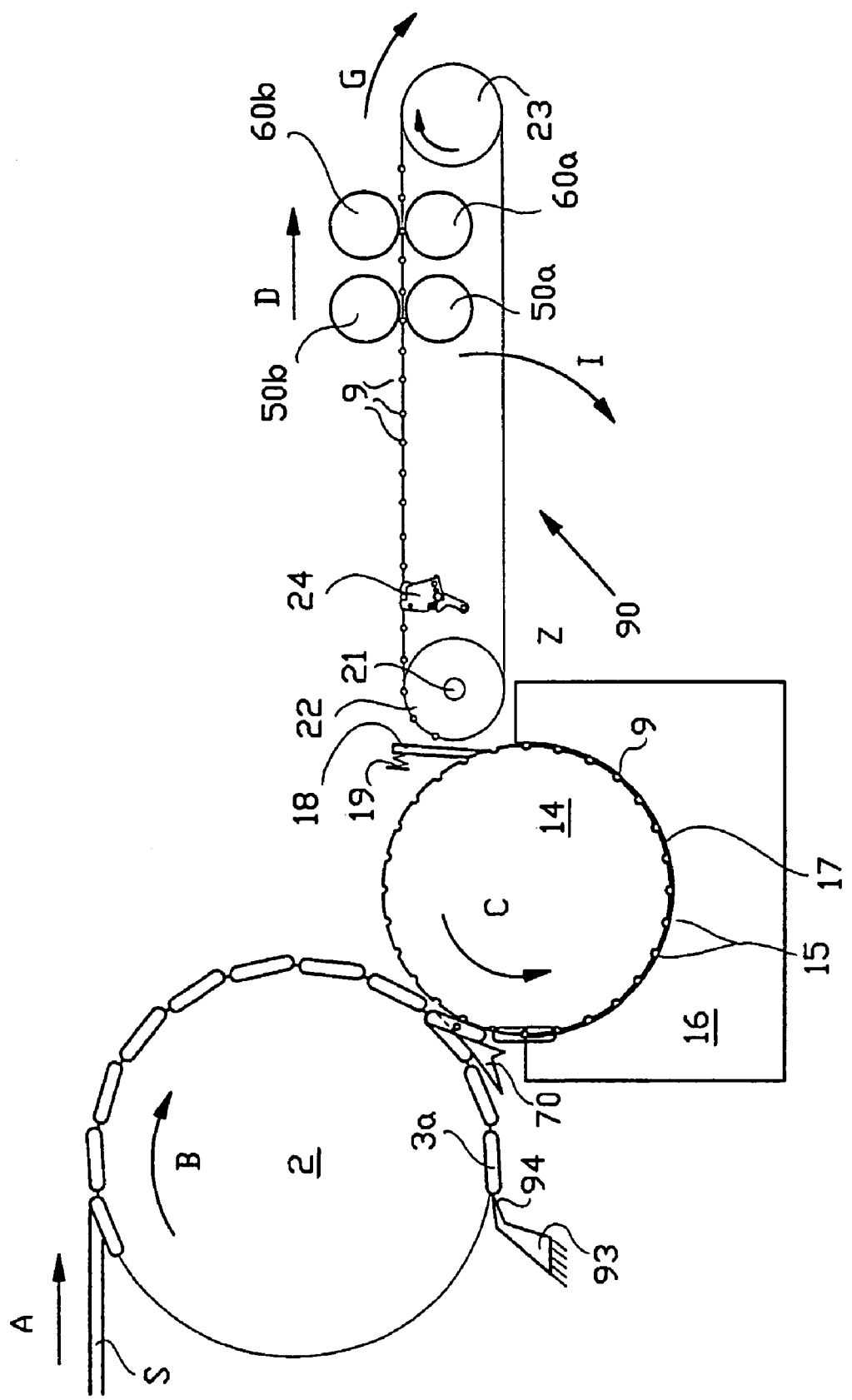
FIG. 4 shows a schematic front view of a device according to the invention.
Figure 4A:
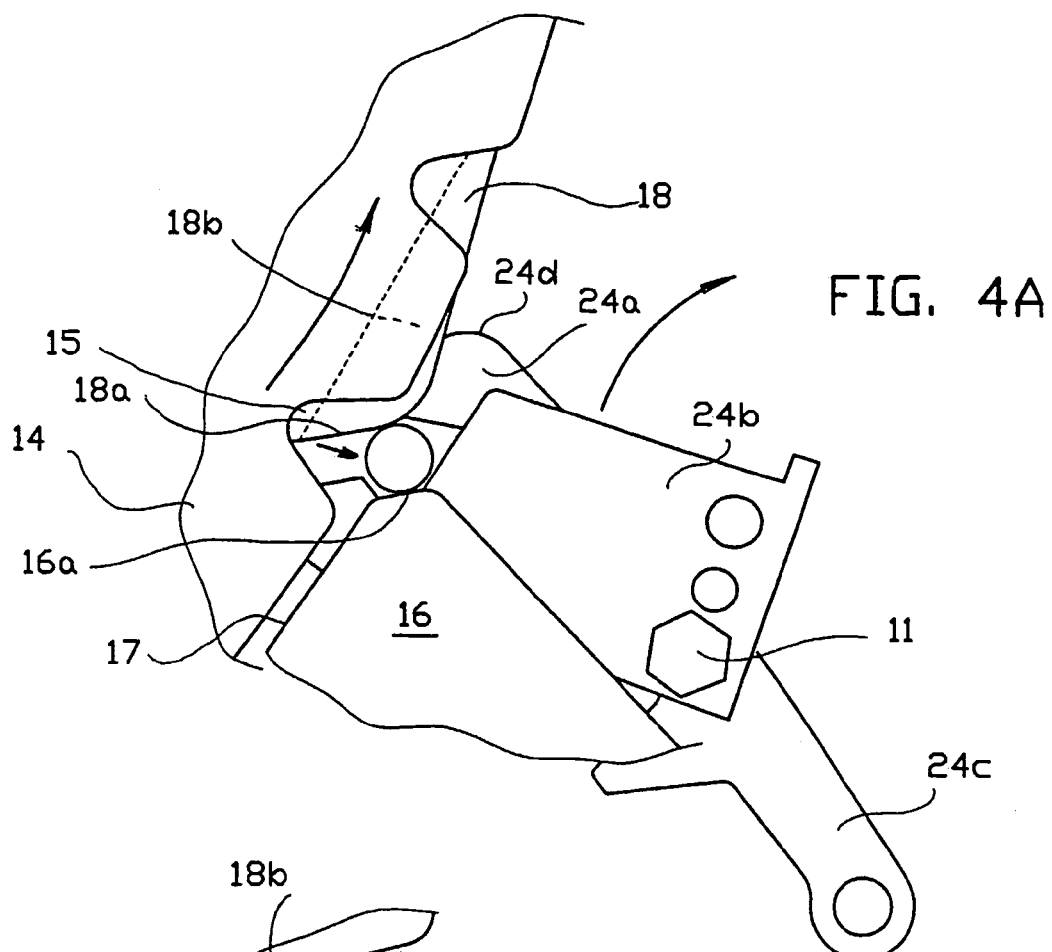
FIGS. 4A and 4B show a detail at the location of the transfer location of sticks in the device of FIG. 4.
Figure 4B:
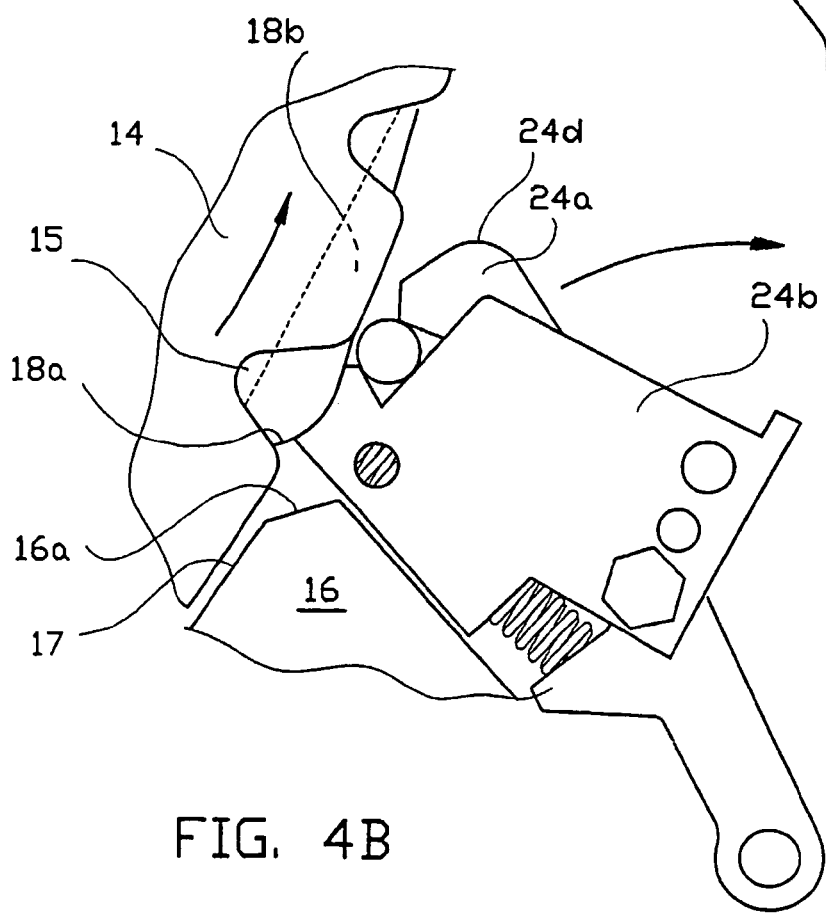

In downstream process direction, the transfer disk 14 connects to the packaging machine 20, which machine 20 comprises means that are not further shown for supplying packaging foil webs 80a, 80b, and the conveyor 90 shown in FIG. 4, which comprises an endless, circulating chain 21, on which stick clamps 24 that are known per se have been arranged, and which circulates in the direction D about rollers 22 and 23, the roller 22 being driven.

The clamps 24 consist of a first clamp 24a and a second clamp 24b, which clamp 24a is rotatable about an axis Y between an open position and a clamping position, and which is spring-biassed towards the clamping position, and for opening is provided with an arm 24c which is operable by means of stationary means on the packaging machine in a manner known per se not shown.

At the location of the transition between the disk 14 and the conveyor 90 a plate-shaped stick lifter 18 is arranged, which by means of a spring means 19 provided at the location of the suspension in its device is spring-biassed towards the conveyor 90 with respect to the stationary parts of the machine 1. The plate 18 is provided with a recess 18b extending inwardly from the edge 18a, which recess extends in the plane of circulation of the clamps 24. The leading head plane 24d of the clamping member 24a may as a result urge the plate 18 upwards against the spring tension and then runs through the recess 18c, whereas the stick runs up on plane 18a.

Because of the tip 18a running up, sticks 9 are urged out of the accommodation spaces 15, just downstream of the end of the edge 17, to urge the sticks 9 into the open clamps 24 after which the clamp 24a is immediately closed. While being urged out of the accommodation spaces 15 the sticks are supported by plane 16a of the plate (or plates) 16. Because the plate 18 and thus the tip 18a are spring-biassed towards the clamp 24, the stick 9 remains in contact with the plane 16a, and the movement of the stick 9 is perfectly controlled during transfer to the clamp 24.

In the front view of FIG. 4, the conveyor 90 is positioned before the pairs of rollers 50 and 60 shown in FIG. 1. Said pairs of rollers 50a, b and 60a,b are driven in the directions E1, E2 and F1, F2, respectively. The rollers 50a,b have cavities 51 and grooves 52 for accommodating lollipops L with sticks 9 in between them. By means of seal profiles 53, 54 the foil webs 80a,b introduced immediately upstream are provided with longitudinal seals. The cavities 51 may also form a channel which is continuous in circumferential direction.

The rollers 60a,b are provided with ribs in between which transverse cavities 64 have been arranged. The ribs on roller 60a have two heated strips 61, and the same goes for the ribs on the roller 60b. The ribs 60a, however, have an anvil strip 63 between the heated strips, whereas on the roller 60b a cutting strip 62 cooperating therewith is present. The rollers 60a,b therefore arrange both a transverse seal in the combined foil web 80a,b and cut it through. Just after that the downstream end of the conveyor 90 is situated where means are provided that are not further shown for opening the clamps 24, so that the completed and packaged lollipops can be dispensed in the direction G in a collection tray that is not further shown.

Figure 5:
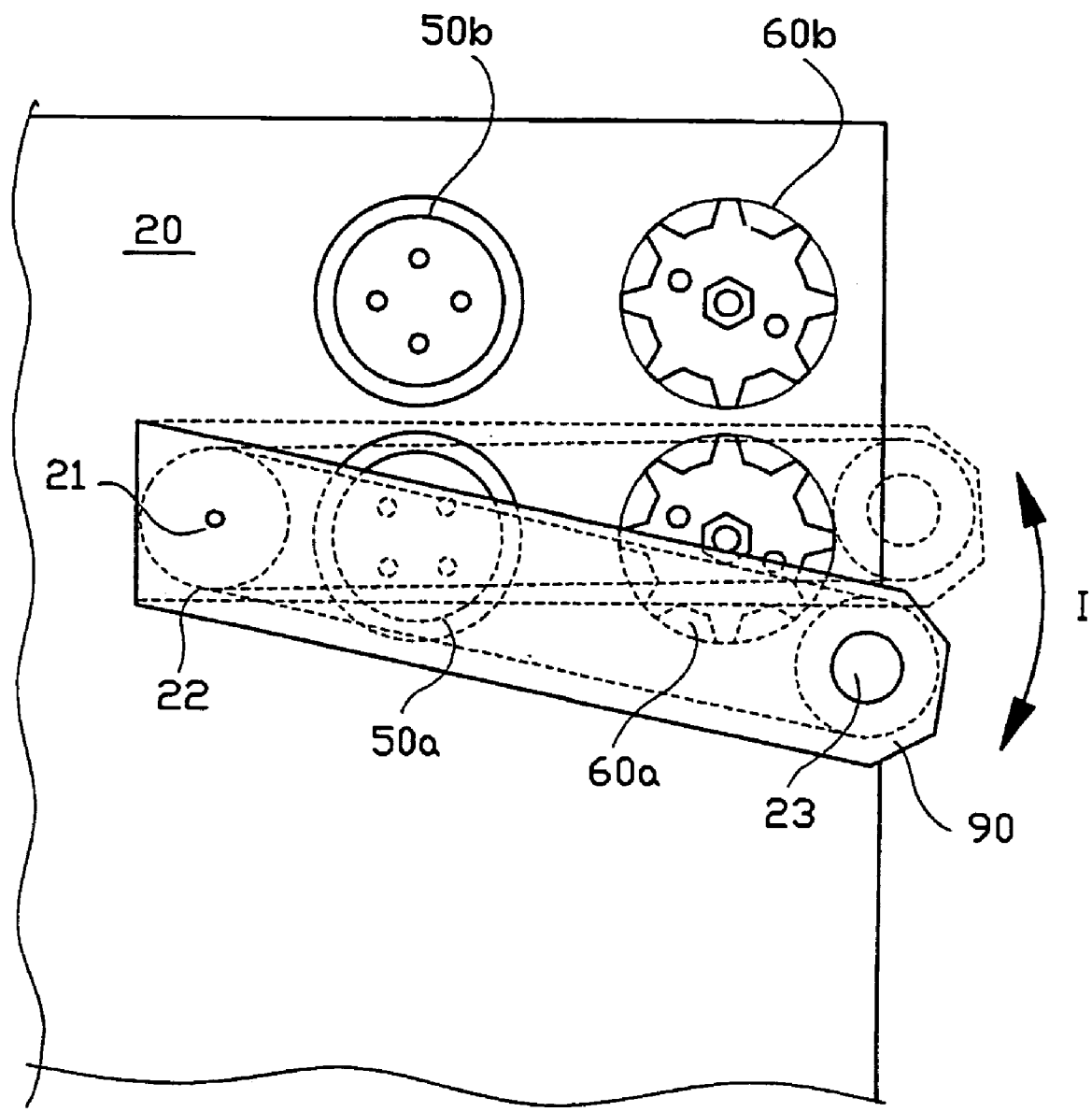
FIG. 5 shows a schematic view of the increase of accessibility of a packaging device in the device according to the invention.

Particular furthermore is, as illustrated in FIG. 5, that the conveyor 90 is tiltable in the direction I and back again, about a centre line coinciding with the pivot centre line 21 of the driven roller 22. After the tilting downward of the conveyor 90 the rollers 50, 60, positioned behind it, are easily accessible for repair and replacement activities, as well for repairing failures. After that the conveyor 90 can be swivelled back and secured in the operational position.

Below the moulding of the lollipops L with filling V will be gone into.

In FIG. 2A the curved drum wall is shown stretched flat for illustrative purposes, whereas the strand S has also been left out. However, some filled moulds have been shown.

Also referring to FIGS. 1 and 1A, the strand S is supplied over the gutter 4, while the upper mould members 3b tilt downwards with their cams 43 over guide 41, towards the drum 10, engaged by the guide 42 at the upper side. As shown in FIG. 2A the upper mould members 3b are therefore urged downwards in direction H. The upper mould members 3b are provided with mould surface 45a and mould surface 45b, that are complementary to each other yet belong to consecutive lower moulds 3a. They have been separated from each other by means of sharp rib 44 which cooperates with rib 30 which is situated between consecutive lower moulds 3a, in order to cut through the strand S at that location.

In FIG. 2B, the situation of the moulds during the folding down of the upper mould 3b is shown. The end 112 of the upper mould 3b is here guided by the rods 41 and 42 (also see FIG. 1A). It can be seen that the rib 30 has an elevated portion 31 and a recessed portion 32, separated from each other by a raised step 33. The rib 44 is shaped complementary to it. By means of the step 33 an upright, sharp discontinuity is formed, as a result of which not only the cutting action between the ribs 30 and 44 during closing the moulds 3 is strongly improved, but also in the continued process, as will be explained, the fleece S' which in practice proved difficult to cut through perfectly, can always be cut through entirely, which results in the lollipops L being entirely separated from each other.

The pressing of the mould members 3b onto the mould members 3a takes place by means of a permanent pressing guide 12 (FIG. 1) placed along the circumference. During said pressing, first the press pins 7 are pressed into the mould, and after that the sticks 9.

The ribs 44 and 30 merge into the flat surfaces 45a, 45b, and so on, via convex edge surfaces. As a result the filling V present in the strand S is also separated, while also forming a layer of shell material M from the strand. The result is that the lollipop L has a filling V, to all sides enveloped by shell material M (FIG. 3).

In FIGS. 2C-E the process of the actual forming of the lollipops L is shown. In FIG. 2B the situation at the moment immediately after closing the mould 3 is shown. The cut off leading portion S' of the strand S, which possibly is still connected to the rest of the strand S via a fleece, and is accommodated in the mould 3, is situated between the steps 33a,b and the left end of the mould 3. The press pin 7 is then urged to the right, and pushes the lollipop mass S' to the right, in the mould cavity. The possible fleece also moves along here, so that portion S' and fleece move along the steps 33a,b see FIG. 2D. Simultaneously from the opposite direction a lollipop stick 9 is urged into the mould cavity, in the oncoming lollipop mass S'. Finally the situation shown in FIG. 2E is achieved, in which the lollipop mass S' pressed into shape, in a reliable manner is entirely separate, so without fleece, from the rest of the strand or the next lollipop mass S' in the next mould. As a result smooth lollipops in the moulds 3 are obtained, which can moreover be removed from them in a reliable manner.

In FIG. 1A a stock 40 of sticks is furthermore shown, which is known per se. New is that at a certain level a sensor 47 has been placed which is able to detect that there are no more sticks present at that level. A central control unit for the device 1 (see FIG. 1) which receives signals from the sensor 47 via the line 101 may then, or after a certain delay, operate the blade 6a, 6b to cut through the strand S. The strand S is then moved towards the drum 2 as long as it is in engagement with the equalizing and drive rollers 5a, 5b. The remaining stock related to the level of sensor 47, the supply speed of the strand S and the location of the drive rollers 5a, 5b with respect to the discharge/exit of the stock of sticks have been entered in the control unit 100.

In FIG. 1 a sensor 48 is furthermore shown which via line 102 is connected to the central control unit 100 and is permanently placed in the device 1 for detecting the presence of the lollipop strand S. Furthermore, as schematically shown in FIG. 1A, the stock of sticks 40 is provided with a closing means 49, which via line is connected tot he central control unit 100. When the sensor 48 detects the absence of strand S, the control unit 100 is informed of this. Said unit is programmed to then activate the closing means 49 via line 103, taking into account the time the trailing end of the strand S needs to arrive in the moulds 3.

The invention claimed is:

1. Device for manufacturing lollipops provided with a stick, comprising a stationary supply for a strand of lollipop material in flat, in particular substantially rectangular cross-section condition, a series of flat lollipop moulds movable past the supply according to a circulating path of movement, each lollipop mould having a main axis parallel to the stick and transverse to the path of movement, each mould consisting of a lower mould and an upper mould, in which the upper mould is movable to be closed onto the lower mould while cutting off a leading portion of the strand, the supply being positioned for discharge of the strand in a direction transverse to the mould main axis, the moulds, considered in cross-sectional plane transverse to the main axis, being inclined with respect to the path of movement.

2. Device according to claim 1, the moulds being arranged on a drum, the lower moulds being a part of the surface of the drum.

3. Device according to claim 1, furthermore provided with a stationary scraper extending from the upstream side to just above the boundaries of the lower moulds.

4. Device according to claim 1, the upper moulds each being defined by connecting portions of two adjacent upper mould members, which are closable in succession onto the lower mould while cutting off a leading portion of the strand, the upper mould members being arranged staggered over half a mould width with respect to the lower moulds, the upper mould members being provided with a first separation rib oriented towards the lower mould, and the lower moulds being separated from each other by means of a second separation rib, which is positioned for closing contact with the first separation rib, the upper mould members being tiltable about an axis transverse to the main axis of the lollipop mould from an open position to a closing position and the separation ribs being capable of performing a cutting action with each other on the strand, the first and second separation ribs in the direction of the main axis being provided with corresponding, vertical discontinuities, such as steps.

5. Device according to claim 4, the discontinuity forming a step oriented perpendicular to the main axis.

6. Device according to claim 5, the discontinuity forming a step forming a cutting side which is substantially tangential with respect to the tilting path of the upper moulds.

7. Device according to claim 4, the discontinuity forming a tip.

8. Device according to claim 4, in the usual manner provided with means active away from the tilting axis for pressing in the lollipop mass in the mould in the direction of the main axis, the second separation rib forming a step oriented away from the tilting axis.

9. Device according to claim 4, the discontinuity being situated approximately halfway the main axis of the mould.

10. Device according to claim 4, the separation ribs being formed smoothly concave.

11. Device according to claim 4, the second separation rib comprising a low portion and a high portion separated by the discontinuity.

12. Device according to claim 10, furthermore provided with a stationary scraper extending from the upstream side to just above the boundaries of the lower moulds, the scraper extending into the path of lower positioned portion of the second separation rib.

13. Device according to claim 1, furthermore provided with means for pressing the mass of the leading portion of the strand accommodated in the mould in the direction of the main axis, as well as with means for urging a lollipop stick into the mass in an opposite direction.

14. Device for manufacturing lollipops provided with a stick, comprising a stationary supply for a strand of lollipop material, a series of lollipop moulds movable past the supply according to a circulating path of movement, each lollipop mould having a main axis parallel to the stick and transverse to the path of movement, each mould consisting of a lower mould and an upper mould, in which the upper mould is movable to be closed onto the lower mould while cutting off a leading portion of the strand, furthermore provided with a stock of lollipop sticks and a stock sensor for detecting the sticks in stock at a certain recognizable level related to a number of sticks in stock, the supply comprising supply rollers active on traction for the strand, as well as a strand cutter positioned upstream of it, the stock sensor and the strand cutter being coupled through a control unit activating the strand cutter with a delay corresponding to the processing time of the number of sticks after the stock sensor no longer detects sticks at the aforementioned level.

15. Device for manufacturing lollipops provided with a stick, comprising a stationary supply for a strand of lollipop material, a series of lollipop moulds movable past the supply according to a circulating path of movement, each lollipop mould having a main axis parallel to the stick and transverse to the path of movement, each mould consisting of a lower mould and an upper mould, in which the upper mould is movable to be closed onto the lower mould while cutting off a leading portion of the strand, furthermore provided with a stock of lollipop sticks and a closing means for the stock, and with a strand sensor at the location of the supply for detecting a strand, the closing means and the strand sensor being coupled through a control unit activating the closing means with a delay corresponding to the passage time of the portion or strand length situated between the closing means or the point of discharge of the sticks to the lollipop moulds and the strand sensor.

16. Device for manufacturing lollipops provided with a stick, comprising a stationary supply for a strand of lollipop material, a series of lollipop moulds movable past the supply according to a circulating path of movement, each lollipop mould having a main axis parallel to the stick and transverse to the path of movement, each mould consisting of a lower mould and an upper mould, in which the upper mould is movable to be closed onto the lower mould while cutting off a leading portion of the strand, the moulds being arranged on a drum, the lower moulds being a part of the surface of the drum, the drum being provided with transverse slits for accommodation of the lollipop sticks, stationary stick lifters being placed in a track of the drum where the moulds are closed and the sticks have been pressed into the lollipop mass, which stick lifters are positioned for transferring the sticks by means of gravitational force to a lollipop transfer drum placed near it and provided with recesses for the sticks for transferring the lollipops to a packaging conveyor, the stick lifters merging into confinements extending along the circumference of the transfer drum for keeping the sticks in the recesses.

17. Device according to claim 16, including a packaging conveyor, the packaging conveyor being provided with stick clamps, and an outwardly spring-biassed transfer means being placed between the transfer drum and the packaging conveyor, which transfer means urges the sticks from the recess on the transfer drum into the clamp of the packaging conveyor.

18. Method for making flat lollipops having a filling, a strand of lollipop material being supplied to a circulating series of moulds, comprising a circulating series of fixed lower moulds and circulating along with them a series of upper moulds that can be opened and closed, whole cutting of the leading portion of the strand necessary for the lollipop in question, the strand being supplied flat, preferably in a direction situated in a plane parallel to the plane of circulation, the lower moulds during accommodation of the leading portion of the strand being kept tilted.

19. Method according to claim 18, the flat strand of lollipop material comprising an enveloped filling.

20. Method according to claim 18, the lower moulds moving according to a path of moulding and the strand being introduced according to an introduction path which is at an acute angle to the path of moulding, considered in a plane parallel to the path of moulding.

21. Method according to claim 20, the lower moulds moving according to a circular path.

22. Device for manufacturing lollipops provided with a stick, comprising a stationary supply for a strand of lollipop material, a series of lollipop moulds movable past the supply according to a circulating path of movement, each lollipop mould having a main axis parallel to the stick and transverse to the path of movement, each mould consisting of a lower mould and an upper mould, in which the upper mould is movable to be closed onto the lower mould while cutting off a leading portion of the strand, the moulds with their in process direction leading edges being situated at a higher level than their in process direction trailing edges.

23. Device according to claim 22, the moulds, considered in crosssectional plane transverse to the main axis, being inclined with respect to the path of movement.

24. Device for manufacturing lollipops provided with a stick, comprising a stationary supply for a strand of lollipop material, a series of lollipop moulds movable past the supply according to a circulating path of movement, each lollipop mould having a main axis parallel to the stick and transverse to the path of movement, each mould consisting of a lower mould and an upper mould, in which the upper mould is movable to be closed onto the lower mould while cutting off a leading portion of the strand, the upper moulds each being defined by connecting portions of two adjacent upper mould members, which are closable in succession onto the lower mould while cutting off a leading portion of the strand, the upper mould members being arranged staggered over half a mould width with respect to the lower moulds, the upper mould members being provided with a first separation rib oriented towards the lower mould, and the lower moulds being separated from each other by means of a second separation rib, which is positioned for closing contact with the first separation rib, the upper mould members being tiltable about an axis transverse to the main axis of the lollipop mould from an open position to a closing position and the separation ribs being capable of performing a cutting action with each other on the strand, the first and second separation ribs in the direction of the main axis being provided with corresponding, vertical discontinuities, such as steps.

25. Device for manufacturing lollipops provided with a stick, comprising a stationary supply for a strand of lollipop material in flat, in particular substantially rectangular cross-section condition, a series of flat lollipop moulds movable past the supply according to a circulating path of movement, each lollipop mould having a main axis parallel to the stick and transverse to the path of movement, each mould consisting of a lower mould and an upper mould, in which the upper mould is movable to be closed onto the lower mould while cutting off a leading portion of the strand, the supply being positioned for discharge of the strand in a direction transverse to the mould main axis, the moulds with their in process direction leading edges being situated at a higher level than their in. process direction trailing edges.

26. Device for manufacturing lollipops provided with a stick, comprising a stationary supply for a strand of lollipop material in flat, in particular substantially rectangular cross-section condition, a series of flat lollipop moulds movable past the supply according to a circulating path of movement, each lollipop mould having a main axis parallel to the stick and transverse to the path of movement, each mould consisting of a lower mould and an upper mould, in which the upper mould is movable to be closed onto the lower mould while cutting off a leading portion of the strand, the supply being positioned for discharge of the strand in a direction transverse to the mould main axis, the upper and lower moulds being sidewardly limited by rounded off edges extending in the direction of the main axis, which edges merge into the first and second separation ribs, respectively.

27. Method for making flat lollipops having a filling, a strand of lollipop material being supplied to a circulating series of moulds, comprising a circulating series of fixed lower moulds and circulating along with them a series of upper moulds that can be opened and closed, whole cutting of the leading portion of the strand necessary for the lollipop in question, the strand being supplied flat, preferably in a direction situated in a plane parallel to the plane of circulation, the lower moulds being kept tilted backwards with respect to the path of moulding.

28. Method for making flat lollipops having a filling, a strand of lollipop material being supplied to a circulating series of moulds, comprising a circulating series of fixed lower moulds and circulating along with them a series of upper moulds that can be opened and closed, whole cutting of the leading portion of the strand necessary for the lollipop in question, the strand being supplied flat, preferably in a direction situated in a plane parallel to the plane of circulation, each upper mould being provided by two consecutive upper mould members, which one after the other are brought into closing engagement with the lower mould in question, the cutting off taking place by means of cooperating cutting edges at both the consecutive upper mould members and the lower mould, the cooperating cutting edges being provided with discontinuities formed in the plane of the cutting motion.

* * * * *